United States Patent Office 3,232,906
Patented Feb. 1, 1966

3,232,906
PROCESS FOR THE PRODUCTION OF POLYOXY-METHYLENES OF HIGH MOLECULAR WEIGHT
Kuno Wagner, Leverkusen, Germany, assignor to Farbenfabriken Bayer Aktiengesellschaft, Leverkusen, Germany, a corporation of Germany
No Drawing. Filed Sept. 19, 1961, Ser. No. 139,053
Claims priority, application Germany, Sept. 29, 1960,
F 32,227
7 Claims. (Cl. 260—67)

The present invention relates to a process of polymerizing formaldehyde in a medium containing alkylating and/or acylating agents as solvents, and containing special tin compounds as catalysts.

With the action of acylation agents on formaldehyde, the esters of the formaldehyde hydrate are formed in known manner, for example the methylene glycol diacetate with acetic acid anhydride. In a reaction which proceeds in a similarly easy manner, readily soluble, liquid dimethyl ether derivatives of methylene glycol are formed from formaldehyde and alkylation agents, such as for example ethyl orthoformate, especially in the presence of acids. The production of serviceable formaldehyde polymers was consequently not possible hitherto when using the aforesaid solvents as reaction media, although such a process would in fact have to produce considerable technical advantage.

The copending U.S. patent application Serial No. 23,126 filed on April 19, 1960, now Patent No. 3,135,718, in the name of Kuno Wagner, relates to a process by which it is possible for monomeric, highly pure and practically anhydrous formaldehyde to be polymerized with good yields into polyoxymethylenes of relatively high molecular weight in both organic acid anhydrides or their mixtures as well as in solvents having an alkylating agent, such as orthoformic acid esters, if care is taken that traces of hydrolysis products of the solvents used as reaction media are substantially removed. It has now been found that polyoxymethylenes of high molecular weight can be easily prepared from relatively impure formaldehyde, both in solvents having an acylating action and in solvents having an alkylating action and containing hydrolysis products, by the formaldehyde being polymerized with the aid of compounds of divalent tin. For carrying out this process, the catalysts can be gradually supplied or can be added in a sufficient quantity to the polymerization medium from the start.

It has been ascertained that a number of divalent and polyvalent metal compounds, for example of copper, cadmium, zinc, iron, cobalt, nickel, and of tetravalent tin, and titanium, are certainly able to polymerise formaldehyde by the method of polymerisation according to the invention, using relatively contaminated formaldehyde (in acylation and alkylation agents), but in this case transfer reactions or chain-breaking reactions caused by the entrained impurities or by the polymerisation media being used proceed several times more quickly than is the case when polymerising with compounds of divalent tin. Consequently, only polymers of no industrial interest are obtained.

When working in accordance with the present invention, not only is it possible to slow down substantially the course of the chain-breaking reactions due to impurities in the formaldehyde, but also substantially to exclude the disadvantageous effect of the hydrolysis products of the reaction medium, so that no appreciable quantities of polyoxymethylenes of low molecular weight are obtained. Furthermore, when using acetic acid anhydride as acylation agent, concentrations of up to 3 to 10% of free acetic acid, related to polymerised formaldehyde, can be accepted. This discovery is particularly surprising, since with the previously proposed processes, when using the above conditions, only polyoxymethylenes of low molecular weight are obtained, which have intrinsic viscosities of 0.35 (measured in dimethyl formamide at 150° C. in 0.5% solution) and which have no properties which are of industrial interest. On the contrary, when working in accordance with the invention, with a water content in the formaldehyde gas of 0.3–0.8% and with an acid content of the acetic acid anhydride from 0.4–0.9%, polyoxymethylenes of high molecular weight and with intrinsic viscosities from 0.6 to 1.9 are obtained, this corresponding to average molecular weights of about 30,000 to 120,000. Examples of the catalysts according to the invention are salts of divalent tin with acetic, propionic, caproic, butyric, 2-ethylcaproic, palmitic, stearic, oleic, crotonic, adipic, sebacic, succinic, tetrapropenyl-succinic, benzoic, alkylated benzoic (p-methylbenzoic, p-tert.-butylbenzoic), salicylic, alkylated salicyclic, p-methoxy-benzoic, phenylacetic, naphthoic, 2-hydroxy-naphthoic, di-n-butyl-naphthoic, naphthalene-1.8-dicarboxylic, cyclohexane-carboxylic, hexahydrophthalic acids or other aliphatic, cycloaliphatic, aromatic, araliphatic carboxylic acids with at least two and up to 19 carbon atoms, which can be substituted, for example, by halogen, nitro groups, hydroxy groups or etherified hydroxy groups, alkyl groups, or tertiary amino groups. Basic metal salts can also be used. The basicity of the basic salts can be defined as follows:

$$\text{Basicity } (B) = \left(\frac{M_{-1}}{E}\right) \cdot 100\%$$

M being the number of equivalents of metal and E being the number of the equivalent of organic acid contained in 100 g. of the sample. The basicity of the salts used can fluctuate within wide limits. It is preferred to employ salts with basicities of 5 to 20%. These salts thus contain the metals in an excess of 5 to 20%, calculated on the quantity theoretically necessary for displacing the acid hydrogen atoms of the organic acids. Salts which have proved especially suitable among the series of basic salts are those of divalent tin, in which $B=10$ to 20%.

It is also possible to use organometallic compounds of divalent tin, such as diphenyl-tin. Freshly prepared, very finely divided or colloidal solutions of divalent tin hydroxide can also be utilised, such as those which can be obtained in for example particularly fine form by hydrolysis of divalent tin salts of organic carboxylic acids in dioxane containing water. It is even possible to use divalent tin salts of relatively strong acids, such as the divalent tin salt of di-n-butyl-naphthalene-sulphonic acid-(1). However, halides and hydroxyhalides of divalent tin are less suitable.

The basic salts to be used according to the invention can easily be prepared by known processes, namely by reacting the corresponding metal hydroxides with the carboxylic acids in an organic solvent or by the corresponding metal halides being reacted with the organic acids in the presence of concentrated NaOH or KOH, any water forming in the latter cases advantageously being distilled off azeotropically with the aid of an organic solvent, such as benzene or toluene. The production of basic salts with any desired B-values (smaller or larger than 100%) is also easily carried out in accordance with the data given in German patent specification 1,086,701 (as open to inspection).

For carrying out the polymerisation process according to the invention, the formaldehyde can be gradually introduced into the polymerisation medium, which as stated consists of an alkylating or acylating solvent. The formaldehyde is constantly activated with freshly supplied catalysts. It is normal to work with a quantity of 0.0007 to 0.01 mol, preferably 0.002 to 0.006 mol, of catalyst per mol of formaldehyde, where the polymerisation is allowed to proceed in acylation agents, whereas it is advantageous to work with smaller concentrations, advantageously with 0.0001 to 0.002 mol of catalyst per mol of formaldehyde, when polymerising in alkylation agents. It is important as regards the quality, yield and the molecular weight of the polyoxymethylenes obtained that the catalyst concentration is at least about $2.10^{-3}$ mol per litre of the acylating solvent on commencing the polymerisation, in order to keep the polyoxymethylenes which are obtained free from impurities of low molecular weight. The catalysts are advantageously used in the form of 0.01 to 2% solutions, for example in acetic acid anhydride, ethyl acetate, methylene chloride, but also in aromatic hydrocarbons, such as toluene, since numerous salts of divalent tin, for example those salts of organic carboxylic acids with more than two carbon atoms, are easily transformed into the relatively sparingly soluble divalent tin acetates after a relative action or on heating in the presence of acetic acid anhydride, it is advantageous when polymerising in acetic acid anhydride to use only such concentrations of divalent tin salts as still do not lead to a precipitation of sparingly soluble divalent tin acetate. Preferred catalyst concentrations in acetic acid anhydride are about 0.05 to 0.5%, preferably 0.1 to 0.3%. The catalyst supplied during the polymerization is preferably proportioned as uniformly as possible throughout the entire period of the polymerisation. Obviously, the speed of supply of the catalyst is variable and depends on the flow velocity at which the formaldehyde is supplied to the polymerisation vessel. It is advantageous initially to supply about 30 to 70% of the required catalyst quantity and to proportion the residual quantities, for example dissolved in acetic acid anhydride or toluene, throughout the entire time period of the polymerisation with a proportioning pump. The primary concentration of the catalyst and its subsequently uniform proportioning is important, because the formaldehyde entrains impurities, which themselves have a catalytic action and in addition the acylating solvents, for example acetic acid anhydride with 0.4 to 0.6% of acetic acid, contain relatively high quantities of extraneous catalysts. This catalytic activity of the latter is, however, of no importance in practice on account of the much higher activity of the catalysts according to the invention, provided these salts are present in sufficient quantity and in addition are constantly supplied to the polymerisation mixture. In this way, the formation of products having a relatively low molecular weight in the polymers is avoided.

For carrying out the process according to the invention, relatively impure formaldehyde containing 0.3 to 0.9% of water can be used. It is advantageous to work with formaldehyde which is contaminated with 0.6 to 0.8% of water. The formaldehyde can contain as other impurities formic acid, methyl formate and formaldehyde-dimethyl acetate in total quantities up to 0.5% and methanol in quantities up to 0.7%. A formaldehyde with this degree of purity can be simply prepared without it having to be freed from water in extensive cooling systems at temperatures below zero; in this case also, the further purification of the formaldehyde gases by washing with organic solvents is also unnecessary. A good source for the production of formaldehyde gas is paraformaldehyde with a water content of 3 to 4%, which is for example thermally decomposed in the presence of a carrier gas, such as nitrogen, in substance or neutral organic solvents of high boiling point. Furthermore, it is also possible to employ formaldehyde production gases, which are first of all brought by known processes to a water content of about 3 to 4%. The main quantity of water is removed by carrying out an initial purification by initial polymerisation at temperatures in a range from about +3° to 30° C. In this way, the serious reduction in yield occurring at lower temperatures is avoided, since the polymers contain relatively large quantities of water in combined form.

For example, it is possible successfully to produce initial polymers, of which a relatively small portion (about 20%) contains about 20% by weight of water in combined form and of which a main portion (about 80%) contains 10–12% by weight of water in combined form, which initial polymers have practically the same properties as the normal commercial so-called readily soluble paraformaldehyde. The initial polymers themselves only take up a fraction of about 20–25% of the paraformaldehyde used for the pyrolysis, so that paraformaldehyde can be employed in a quantity up to about 75 to 80% for the production of polyoxymethylenes of high molecular weight. The purification can easily be carried out continuously with conventional apparatus by the initial polymers with a high water content and of very low molecular weight being constantly removed mechanically; in this way, the further ageing thereof to products of higher molecular weight and a renewed delivery of water to the formaldehyde vapours is prevented. It is obvious that also substantially purer formaldehyde can be polymerised by the process of the invention, but then polyoxymethylenes of very high molecular weight are obtained, which are difficult to process on account of their high melt viscosity.

Aliphatic, cycloaliphatic and aromatic or other organic acid anhydrides are suitable for carrying out the process according to the invention in acylation agents, such as the anhydrides of acetic acid, propionic acid, butyric acid, stearic acid, benzoic acid, as well as substituted derivatives of these acid anhydrides, mixtures of these acid anhydrides with one another, mixed acid anhydrides and also maleic and succinic acid anhydrides. Where the said acid anhydrides are solid, they are used in solution in neutral organic solvents for the polymerisation. It is preferred to use acetic acid anhydride, since this is proved to be most reactive in the acylation reaction carried out in the second phase and in addition is especially suitable as polymerisation medium on account of its low solidification temperature.

The carboxylic acid anhydride can also be used in admixture with inert, organic solvents, as which it is possible to employ aliphatic, cycloaliphatic, aromatic and araliphatic hydrocarbons, halogenated hydrocarbons, esters of aliphatic carboxylic acids with aliphatic, cycloaliphatic or araliphatic alcohols and/or ethers of aliphatic, cycloaliphatic and/or araliphatic alcohols, in quantities up to about 100%, calculated on acid anhydride. The following are to be mentioned as examples of inert solvents: benzene, toluene, ethylbenzene, propylbenzene, diisopropylbenzene, cyclohexane, decalin, tetrahydronaphthalene, hexane, heptane, octane, methylenechloride, chloroform, carbontetrachloride, 1,2-dichloropropane, dichloroethylene, diethylether, diisopropylether, dibutylether, anisole, butyrolactone, esters of aliphatic monocarboxylic acids with saturated monohydric alcohols, such as ethylacetate, propylacetate, butylacetate, butylpropionate, ethylbutyrate, glycolmonomethyletheracetate.

For carrying out the process of the invention in the presence of alkylation agents, there are preferably used ortho esters, such as methyl, ethyl, or propyl ester of orthoformic acid, or mixtures of the said ortho esters with formaldehyde-dimethyl acetal, formaldehyde-diethylacetal, formaldehyde-dipropylacetal, ethylene glycol-formaldehyde acetal or ketals, such as ketals obtained from acetone, on the one methanol, ethanol, or propanol on the other hand. Tetraethyl or methyl esters of silicic acid can also be used for carrying out the polymerization.

The polymerization can take place in a temperature range from −120° to +40° C., however, it is advantageous to work at temperatures between −15° and +35° C.

The flow velocity at which the formaldehyde is introduced into the polymerization vessel is capable of being varied and depends on the speed of pyrolysis and also on the temperature in the polymerization vessel.

In order to reduce the molecular weights other metal salts, such as those of divalent copper, nickel, iron, cobalt, calcium, magnesium and of sodium, especially with organic acids (for example aliphatic, cycloaliphatic, araliphatic, aromatic carboxylic acids, such as acetic, propionic, 2-ethylcaproic, cyclohexane-carboxylic, phenylacetic, benzoic acids), organo-metallic compounds, such as butyl-lithium, triethyl-aluminium, triphenyl-aluminium, diphenyl-aluminium, phosphines, Grignard compounds, such as phenyl magnesium bromide or complex salts of polyvalent metals, such as acetyl acetonates or dithiocarbamic acid salts, can be used in combination with the said catalysts, especially the divalent tin salts. These additional compounds are advantageously used in quantities of 10–60% by weight, based on the catalysts according to the invention. It is also possible to use tertiary bases, such as pyridine, tri-n-butylamine, n-methyl morpholine, n-methyl-piperidine and the like, which are added to the formaldehyde polymerization catalysed with the divalent tin compound in order to reduce the average molecular weight of the resulting polymers. However, care is to be taken in this case that the molar quantity of base does not exceed the molar quantity of the divalent tin compound, since otherwise disturbances in the progress of polymerization occur, which can lead to complete deactivation of the divalent tin catalysis. In order to avoid such disturbing effects, care is also to be taken that for example acetic acid anhydride is as free as possible from traces of strong acids, such as $H_2SO_4$, HCl and also $SO_2$. Furthermore, the carrier gases which are possibly used should be as free from oxygen as possible and also free from traces of basic impurities.

After completing polymerization, where this has taken place in solvents having an acylating action, complete acylation is effected at elevated temperature, for example 90 to 160° C. and advantageously 120 to 140° C., if necessary also under pressure, it being possible for acylation catalysts, such as tertiary bases (trimethylamine, triethylamine, tri-n-butylamine, pyridine, n-methyl morpholine, N,N'-dimethyl piperazine), sodium acetate, potassium acetate and secondary sodium phosphate to be added in quantities up to 20% by weight and preferably 0.5 to 5% by weight, based on polyoxymethylene. The acylation can for example be effected by the process disclosed in French patent specifications No. 1,245,311 and 1,250,392. On the other hand, where polymerization has taken place in solvents having an alkylating action, it is advisable after completing polymerization to add acid catalysts, such as ammonium nitrate, boron trifluoride, adducts of borontrifluoride and tetrahydrofuran or dioxane oxonium salts, such as triethyl-oxonium fluoborate and the like, for carrying out the alkylation. In this case, it is preferred to work in accordance with the data given in French patent specification No. 1,238,071.

Both with the polymerization and the subsequently conducted acylation or alkylation, it is usually desirable to employ about 5 to 20 parts by volume and preferably 7 to 12 parts by volume of the reaction medium to 1 part by weight of formaldehyde or polyoxymethylene respectively.

The process according to the invention thus renders it possible for the polymerization of formaldehyde to polyoxymethylenes of higher molecular weight and also the stabilization thereof by acylation or alkylation to be carried out in one and the same reaction system, by simply choosing in the second reaction phase a temperature which is sufficiently high for the complete acylation or alkylation which temperature guarantees a reaction of the terminal groups and leads to the stabilization of the polyoxymethylenes. This method of procedure provides the essential advantage that the stabilization of the primarily obtained polyoxymethylenes can be effected immediately and without changing the solvent. This circumstance is of particular importance because firstly the primarily obtained polymerization product is substantially penetrated by the alkylation and acylation agents which per se do not dissolve the polymers. Thereby an improved possibility of reaction of the terminal groups is provided, in that the acylation or alkylation otherwise only heterogeneously and slowly operative from the surface of the polyoxymethylene crystallites can in this case take place considerably more easily. On the other hand, the separation of large quantities of neutral organic solvents and the drying of the unstabilised polyoxymethylenes which retain relatively large quantities of solvents is obviated with the process according to the invention. Another great advantage of the process according to the invention, over the prior known polymerization processes, also consists in that relatively impure formaldehyde can be polymerized in a simple and economic manner and practically quantitatively to form polyoxymethylenes of high molecular weight. One essential advantage also consists in the ready availability of the impure formaldehyde used for the polymerization. Accordingly, the process can be operated continuously without any difficulty.

The polyoxymethylenes prepared by the process according to the invention and stabilised by the methods indicated above can be processed with and without additions of other substances into high-grade plastics; such substances are for example stabilisers, antioxidants, plasticisers, fillers, pigments and the like.

In the following examples, the parts indicated are parts by weight, unless otherwise mentioned.

*Example 1*

200 parts of paraformaldehyde with a water content of 3.5% are subjected in substance or in a neutral heat carrier, such as diisopropyl benzene or polypropylene glycol of the average molecular weight 2000, to thermal decomposition at 120–150° C. in a three-necked flask. The latter is equipped with a stirrer device, an inlet pipe for nitrogen, a thermometer and a discharge pipe for the forming formaldehyde vapours. The discharge pipe has a gradient of about 30° and it is connected through a three-way pipe section to a 500 cc. round-bottomed flask and also to a vertically ascending pipe with a length of 30 cm. and a cross-section of 2 cm. The round-bottomed flask and pipe serve to receive initial polymers with a water content of 18–20 and 9–12% by weight, respectively. The pipe is kept at a temperature of 20–30° C. (water content of the formaldehyde: 0.65%, yield of formaldehyde gas: 77%).

The formaldehyde vapours leaving the vertical pipe are introduced without further purification and cooling and by way of an inlet union into a polymerisation vessel which is provided with mechanical stirrer devices for the inlet union and also for the reaction mixture, as well as with a gas discharge pipe and a graduated dropping funnel for the addition of the catalyst solution. Disposed in the polymerisation vessel are 1000 parts by volume of acetic acid anhydride with a free acetic acid content of 0.44%. The polymerisation vessel is kept at about −12 to +10°. On starting polymerisation, 2.5 parts of the divalent tin salt of 2-ethylcaproic acid are added to the polymerisation mixture; thereafter, during a period of 150 minutes, another 0.5 part of the same catalyst, dissolved in 200 parts by volume of acetic acid anhydride, is introduced dropwise at a speed of about 1.2 parts by volume per minute. The polymerisation is completed after 150 minutes. The suspension which is obtained has added thereto another 400 parts by volume of acetic acid anhydride and 3 parts of sodium acetate. The reaction mixtures is heated to 138° C. and kept at this temperature for 5 hours. The polyoxymethylene diacetate is then suction-filtered, washed with acetone and water and finally with acetone again and dried in vacuo at 40° C. White, polyoxymethylene of high molecular weight is obtained with an intrinsic viscosity of 1.35 (measured in 0.5% solution in dimethyl formamide or butyrolactone at 150° C.) with a yield of 140 parts equals 96%, calculated on the formaldehyde (145 parts) actually polymerised in the reaction vessel.

*Example 2*

The procedure is as indicated in Example 1. After polymerisation is completed, the polymer is sunction-filtered, washed with acetic acid anhydride and freed from uncombined catalyst. The pure white polymer is stirred with 1700 parts by volume of acetic acid anhydride and 2 parts of sodium acetate to form a paste. The reaction mixture is heated to 138° C. and kept at this temperature for 5 hours. The polyoxymethylene diacetate which is obtained is suction-filtered, washed with acetone, water and again with acetone and dried in vacuo at 40° C. A polyoxymethylene of high molecular weight is obtained with an intrinsic viscosity of 1.4 (measured at 150° C. in butyrolactone in 0.5% solution); yield: 141 parts.

*Example 3*

The procedure is as indicated in Example 1, but by way of distinction an acetic acid anhydride with only 0.2% free acetic acid is used and a solution of 2 parts of divalent tin octoate in 5 parts by volume of ethyl acetate is supplied as catalyst solution to the polymerisation vessel. After polymerisation and acetylation has been effected in accordance with Example 1, a polyoxymethylene of high molecular weight is obtained which has an intrinsic viscosity of 2.5 (measured in dimethyl formamide or butyrolactone in 0.5% solution at 150° C.). Yield: 130 parts of polyoxymethylene of high molecular weight.

*Example 4*

The procedure is as indicated in Example 3, the polymerisation medium consisting of 500 parts by volume of acetic acid anhydride, 500 parts by volume of methylene chloride and 2 parts of divalent tin octoate. After polymerisation, removal of the methylene chloride and acetylation with pyridine as catalyst, a polyoxymethylene of high molecular weight is obtained, having an intrinsic viscosity of 2.2 (measured in butyrolactone at 150° C. in 0.5% solution). Yield: 128 parts of polyoxymethylene of high molecular weight.

*Example 5*

The procedure is as indicated in Example 3, but using divalent tin acetate as catalyst, this being freshly prepared in the following manner from divalent tin octoate: 3 parts of divalent tin octoate are briefly heated to boiling point in 100 parts by volume of acetic acid anhydride. After cooling, the divalent tin acetate precipitates in voluminous form and after filtration, is dissolved in fresh boiling anhydride and added to the polymerisation vessel. After polymerisation and acetylation in accordance with Example 1, a polyoxymethylene of high molecular weight is obtained, with an intrinsic viscoisty of 1.78 (measured in butyrolactone in 0.5% solution). Yield: 110 parts of polyoxymethylene of high molecular weight.

*Example 6*

The procedure is as indicated in Example 1, but using 1000 parts of propionic acid anhydride with a content of 0.39% of free propionic acid as polymerisation medium. After polymerisation and acetylation in accordance with Example 1, with sodium acetate as catalyst, a polyoxymethylene of high molecular weight is obtained with an intrinsic viscosity of 1.43 (measured in butyrolactone at 150° C. in 0.5% solution). Yield: 105 parts of polyoxymethylene of high molecular weight.

*Example 7*

The procedure is as indicated in Example 1, but 1000 parts of a mixture of 500 parts of acetic acid anhydride with a free acetic acid content 0.42%, 200 parts of benzoic acid anhydride and 300 parts of ethyl acetate, containing dissolved therein 2 parts of divalent tin octoate. After polymerisation, working-up according to Example 2 and acetylation in fresh acetic acid anhydride, the polyoxymethylene of high molecular weight is obtained with an intrinsic viscosity of 1.15 (measured in butyrolactone at 150° C. in 0.5% solution). Yield: 95 parts of polyoxymethylene of high molecular weight.

*Example 8*

The procedure is as indicated in Example 1, but using an acetic acid anhydride with a free acetic acid content of 0.2% and the following catalysts:

(a) 2 parts of tin-II-oleate
(b) 3 parts of tin-II-hexahydrophthalate
(c) 2 parts of a divalent tin salt of 2-hydroxy-5-tert-butyl-benzoic acid
(d) 3 parts of a divalent tin salt of tetrapropenylsuccinic acid
(e) 2 parts of tin-diphenyl
(f) 3 parts of finely divided tin-II-hydroxide, prepared from tin-II-octoate and 100 parts by volume of dioxane and 1 part by volume of water
(g) 2 parts of the divalent tin salt of di-n-butyl-naphthalene-sulphonic acid-(1).

After polymerisation, acetylation and working-up in accordance with Example 1, the polyoxymethylenes of high molecular weight indicated in the table are obtained, with the indicated viscosities (measured in butyrolactone at 150° C. in 0.5% solution).

| Catalyst | Intrinsic viscosity | Yield, parts |
|---|---|---|
| (a) | 2.5 | 125 |
| (b) | 1.63 | 108 |
| (c) | 1.78 | 100 |
| (d) | 1.59 | 114 |
| (e) | 1.99 | 104 |
| (f) | 1.15 | 85 |
| (g) | 1.85 | 109 |

*Example 9*

The procedure indicated in Example 1 is followed but the alkylation medium comprising the ethyl ester of orthoformic acid is used as polymerisation medium. 0.3 part of divalent tin octoate per 1000 parts by volume of orthoester are used for the polymerisation. If the substance is filtered off after polymerisation and the polymer is washed with acetone and dried at 40° C. in vacuo, 150 parts of a polyoxymethylene of high molecular weight are obtained, having an intrinsic viscosity of 2.2 (measured in butyrolacetone at 150° C. in 0.5% solution), the terminal groups thereof consisting of more than 50% of terminal hydroxyl groups. On the other hand, if the polymer is not filtered off after completing polymerisation, but is alkylated in the presence of catalytic quantities of boron trifluorideetherate for 3 hours at 120° C. in accordance with the procedure indicated in French patent specification No. 1,238,071, a substantially 70%-alkylated polyoxymethylene of high molecular weight is obtained with an intrinsic viscosity reduced by degradation to 1.1 (measured in butyrolactone in 0.5% solution at 150° C.). Yield: 88 parts.

*Example 10*

The procedure is as indicated in Example 9, but using as polymerisation media (a) 1000 parts by volume of formaldehyde-dimethylacetal, (b) 500 parts by volume of formaldehyde-dimethylacetal and 500 parts by volume of ethylene glycol-formaldehyde acetal and (c) 500 parts by volume of formaldehyde-dimethyl-acetal, 250 parts by volume of diisopropyl ether and 250 parts by volume of ethyl acetate. 0.3 part of divalent tin octoate is used as catalyst for the polymerisation. The formaldehyde used for polymerisation purposes has a water content of 0.72%.

| Polymerisation medium | Intrinsic viscosity | Yield, parts |
|---|---|---|
| Mixture (a) | 2.3 | 145 |
| Mixture (b) | 1.9 | 130 |
| Mixture (c) | 2.4 | 142 |

*Example 11*

In order to reduce the average molecular weight of the polyoxymethylene diacetate obtained according to Example 3, which have a very high molecular weight with an intrinsic viscosity of 2.5 (measured at 150° C. in butyrolactone in 0.5% solution), the procedure is the same as that indicated in Example 3, but using the following compounds as additional catalysts:

(a) 0.1 part of sodium acetate
(b) 0.5 part of zinc octoate and 0.5 part of the isopropyl ester of antimonous acid
(c) 0.1 part of tri-n-butylamine.

After completing polymerisation, which clearly proceeds more slowly than with pure divalent tin octoate and after carrying out acetylation and working-up in accordance with Example 1, polyoxymethylenes of high molecular weight are obtained which have the following greatly reduced intrinsic viscosity values (measured in butyrolactone at 150° C. in 0.5% solution).

| Addition | Intrinsic viscosity | Yield, parts |
|---|---|---|
|  | 2.5 | 120 |
| (a) | 0.84 | 89 |
| (b) | 1.45 | 110 |
| (c) | 1.08 | 105 |

Further suitable catalysts for carrying through the present polymerisation process are the salts of divalent tin with ethoxyacetic acid, 2-methoxypropionic acid, 4-chlorobenzoic acid, 2,5-dichlorobenzoic acid, chloroacetic acid, 4-nitrobenzoic acid, p-dimethylaminobenzoic acid or with heterocyclic carboxylic acids, especially those containing oxygen as a heteroatom, such as furan carboxylic acid-(2).

When carrying through the polymerisation of formaldehyde under the conditions of the present invention there are obtained polyoxymethylenes having a molecular weight of at least 10,000, preferably of about 30,000 to 120,000, the hydroxyl groups of which polyoxymethylenes are partially esterified or etherified respectively (to about 10 to 60%). When said polyoxymethylenes are acylated or alkylated in the disclosed second reaction step there are obtained polyoxymethylenes, which are in the case of acylation substantially completely esterified, and which in the case of alkylation are etherified to about 70–90%. Further suitable catalysts for carrying through the esterification or etherification of the second reaction step are disclosed in French patent specification 1,255,257 and in British patent specification 770,717 respectively. The catalysts for the alkylation reaction may be applied in amounts up to 1%, preferably 0.05–0.5%, as calculated on the weight of polyoxymethylene. The alkylation itself is preferably carried through at temperatures of 60–140° C., preferably 80–120° C.

I claim:

1. A process for the production of high molecular weight polyoxymethylenes, the terminal group of the polymer chain thereof being selected from the group consisting of an ester and an ether group, which comprises polymerizing monomeric formaldehyde containing 0.3–0.9% by weight of water by contacting said formaldehyde at a temperature of about −40 to +40° C. with a catalytic amount of a divalent tin salt of a carboxylic acid having from two up to 19 carbon atoms in the presence of at least 5 parts by volume, to 1 part by weight of formaldehyde, of a compound selected from the group consisting of a carboxylic acid anhydride acylating agent and an orthoformic acid lower alkyl ester, subsequently raising the temperature into the range of about +60° C. to about +160° C. and separating from the polymerization medium the high molecular polyoxymethylenes having one of the aforesaid terminal groups.

2. The process of claim 1 wherein said carboxylic acid anhydride is acetic acid anhydride.

3. The process of claim 1 wherein said orthoformic acid alkyl ester is the ethyl ester of orthoformic acid.

4. The process of claim 1 wherein said divalent tin compound is the tin-II-salt of the 2-ethylcaproic acid.

5. The process of claim 1 wherein said polymerization is conducted in an inert organic liquid.

6. The process of claim 1 wherein said tin salt is a basic salt of tin with a carboxylic acid having from three to 19 carbon atoms.

7. The process of claim 5 wherein said inert organic liquid is methylene chloride.

References Cited by the Examiner

UNITED STATES PATENTS

| 2,395,307 | 2/1946 | Weber et al. | 260—414 |
| 2,848,437 | 8/1958 | Langsdorf et al. | 260—67 |
| 2,951,828 | 9/1960 | Zeile et al. | 260—77.5 |
| 2,964,500 | 12/1960 | Jenkins et al. | 260—67 |
| 2,989,505 | 6/1961 | Hudgin et al. | 260—67 |
| 2,998,409 | 8/1961 | Nogare et al. | 260—67 |
| 3,005,799 | 10/1961 | Wagner | 260—67 |
| 3,017,389 | 1/1962 | Langsdorf et al. | 260—67 |
| 3,135,718 | 6/1964 | Wagner et al. | 260—67 |

WILLIAM H. SHORT, *Primary Examiner.*

H. N. BURSTEIN, *Examiner.*